United States Patent Office 2,942,310
Patented June 28, 1960

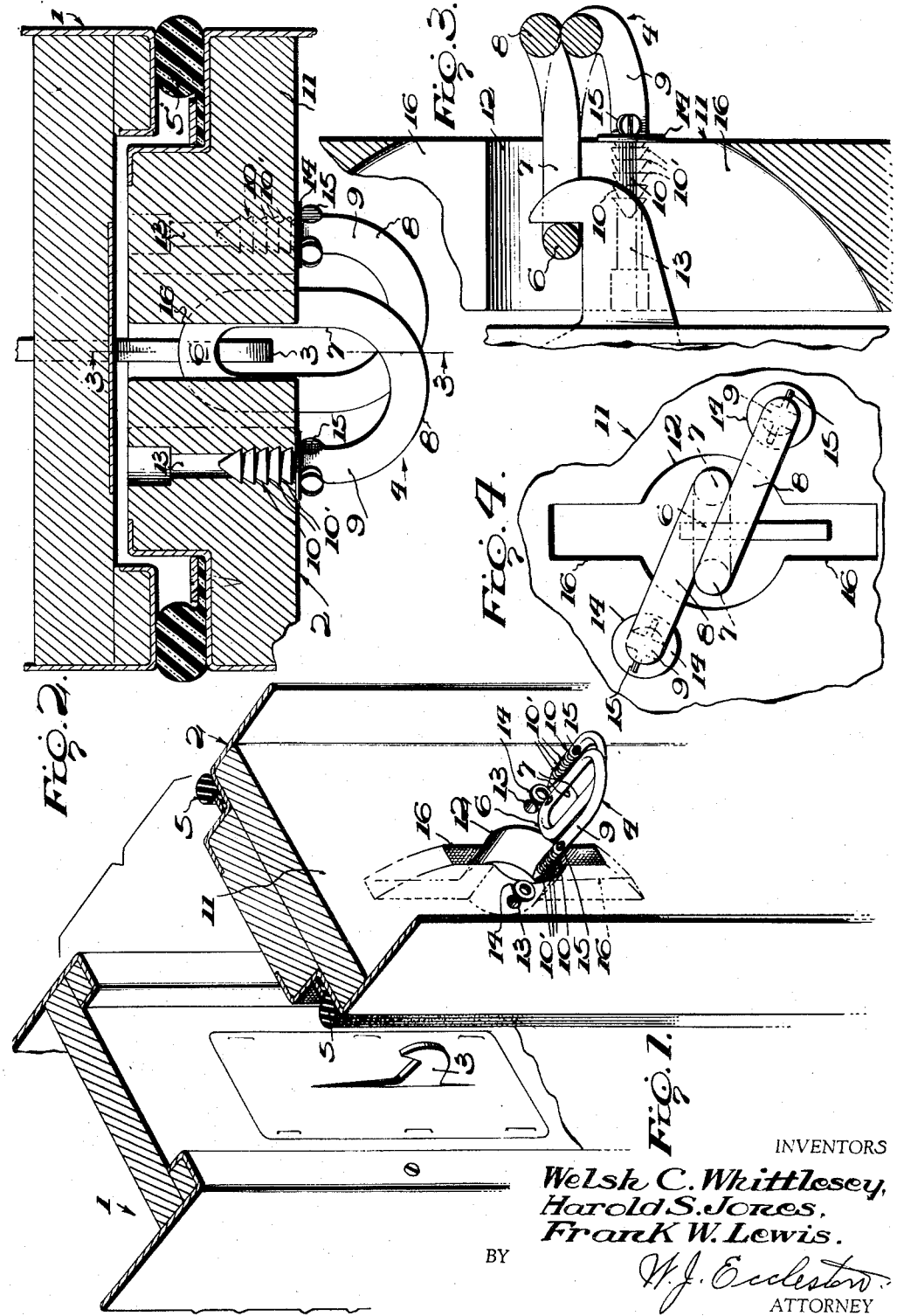

2,942,310

RESILIENT KEEPER UNIT FOR HOOK AND EYE TYPE FASTENERS

Welsh C. Whittlesey, Holliston, and Harold S. Jones and Frank W. Lewis, Framingham, Mass., assignors to the United States of America as represented by the Secretary of the Army Filed Apr. 7, 1954, Ser. No. 421,716

2 Claims. (Cl. 20—92.4)

(Granted under Title 35, U.S. Code (1952), sec. 266)

The invention described herein, if patented, may be manufactured and used by or for the Government for governmental purposes, without the payment to us of any royalty thereon.

This invention relates to hook and eye type fasteners and particularly to fasteners for refrigerator panels in which a sealing gasket is placed between the edges of adjoining panels, and the panels drawn tightly together after engagement of the hook and eye, the seal being maintained by the resiliency in the gasket and in the hook or eye of the fastening means.

One of the objects of the invention is to provide a resilient keeper unit which is extremely simple in construction, and consequently of relatively low cost in both production and installation.

A further object of the invention resides in the provisions of a keeper unit formed up from a single piece of metal bar stock or the like, of suitable diameter, to provide an eye combined with resilient arch portions to thereby maintain the panel joint under adequate pressure at all times.

Other objects and advantages of the invention will be apparent from the following description when taken in connection with the accompanying drawings, in which Figure 1 is a fragmentary perspective view of a pair of refrigerator panels about to be joined at their edges and tightly clamped together in abutting relationship;

Figure 2 is a horizontal sectional view through a panel joint and the panels clamped in abutting relationship;

Figure 3 is a fragmentary sectional view taken on line 3—3 of Figure 2, and,

Figure 4 is a front elevational view of an edge of one of the panels in which the novel keeper unit is mounted.

In the manufacture and assembly of prefabricated refrigerator housings in which a plurality of panels are employed it is highly desirable, if not absolutely essential, that the abutting edges of the panels be tightly drawn together and sealed against the entrance or exit of air through the joint. To this end it is usual to employ a tongue and groove joint between adjacent panels, place a gasket at the joint between the panels so that it is compressed when the panels are joined together, and embody a substantial degree of resiliency in the clamping means so that a constant and continued pressure is applied to the sealing gasket for forming the seal. In the present illustration the numerals 1 and 2 illustrate generally two refrigerator panels about to be joined, in one of which is mounted a hook 3 and in the other is mounted an eye or keeper unit 4 for receiving the hook 3. The sealing gasket mounted in the joint between the two panels is indicated by the numeral 5.

In practically all hook and eye type fasteners of this general type the hook is arranged so as to be swung about a pivot for engagement or disengagement from the eye, and after engagement the operating mechanism for the hook is such as to impart a longitudinal pull upon the hook so as to draw the parts into tight abutting relationship. Since the present invention relates to the eye or keeper portion of the fastener the hook portion 3 is indicated only generally and the means for operating the same has been omitted. The eye is preferably formed of metal bar stock of suitable gage and is bent at its midportion 6 to provide the loop or eye 7 which is to be engaged by the hook 3. The metal bar from which the keeper unit is formed is of sufficient length so that after forming the eye 7 the ends of the bar are further bent to provide the relatively wide arched portions 8 and parallel extensions 9 which terminate in integral anchoring pins 10 formed by providing a series of undercut annular grooves 10' in the body of the metal forming the extensions.

The eye or keeper unit 4 is installed from the interior of the panel as clearly indicated in Figures 1, 2 and 3 and the end block 11 of the panel is provided with an opening 12 in which the eye portion 7 is received. This eye portion when installed must be in a plane substantially at right angles to the plane of movement of the hook 3, and consequently the openings 13 in the end block 11 in which the anchoring pins are received must be in planes paralleling the plane of the eye 7 but on opposite sides thereof as clearly indicated in Figure 4. This offsetting of the openings 13 is necessary because of the fact that the keeper unit is formed of a single piece, and after the eye portion 7 is formed by the bend 6 at the mid-portion of the bar the arched portions 8 extend into planes paralleling the plane of the eye but on opposite sides of the eye, as more clearly indicated in the sectional view at the right of Figure 3.

As clearly indicated in Figure 2 the anchoring pins 10 are projected into the openings 13 in the end block 11 so that the ridges formed by the annular grooves 10' frictionally engage the walls of the openings, although little or no force is applied to the keeper unit 4 which would tend to withdraw the pins from the openings 13. Washers 14 encircle the anchoring pins just beyond the ridges 10' to provide bearing surfaces between the keeper unit and the end block 11, and the projections 9 are upset or otherwise distorted to provide a plurality of shoulders or stakes 15 which bear against the washers 14 especially when a pull is placed on the eye 7 by the hook 3 of the fastening means.

In order that the hook 3 may engage the eye 7 from either direction, that is, from the bottom or top depending upon whether the panel 1 is in the position shown or inverted through an angle of 180°, the block 11 is provided with upper and lower slots 16 which communicate with the opening 12 in which the eye 7 is mounted. These slots 16 are of sufficient length and of such shape as to allow for the necessary swinging movement of the hook 3 about its pivot so as to bring it into horizontal position and into engagement with the eye 7. Thereafter, as heretofore stated, a longitudinal pull is exerted upon the hook 3, by its mechanism, so as to apply a pull to the eye 7 thereby exerting an equal pull on the panel 2 and compressing the gasket 5 into sealing relation with the panel 1 as clearly indicated in Figure 2.

From the foregoing description taken in connection with the accompanying drawings, it will be apparent to those skilled in the art that we have devised an exceedingly simple and inexpensive construction of eye or keeper unit which is formed of a single piece of metal bar stock, that by reason of the arched portions 8 formed in substantially the plane of the eye 7 a very substantial spring action may be applied to the unit through the operation of the hook 3 and such resilient pressure imparted to the gasket 5 to completely seal the joint from the entrance or exit of air with respect to the refrigerator.

In accordance with the patent statutes we have described what we consider to be the preferred form of the invention, but since various minor structural modifications may be made without departing from the spirit of the invention, it is intended that all such changes be included within the scope of the appended claims.

We claim:

1. In combination with a refrigerator panel having a slot extending through an edge thereof and a hole adjacent each side of said slot, a one-piece keeper unit comprising an eye formed of metal stock positioned in the slot, a pair of arched portions integral with the side portions of the eye, said arched portions being sufficiently wide to form a resilient support for the eye, and terminating in anchoring pins located in said holes.

2. In combination with a refrigerator panel having a slot extending through an edge thereof and a hole adjacent each side of the slot, a one-piece keeper unit comprising an eye formed of metal stock doubled upon itself, the free ends of the metal being bent so as to cross each other to provide a substantially oval eye portion positioned in the slot and terminating in anchoring pins paralleling the sides of the eye and positioned in said holes, integral arched portions connecting said pins and the sides of the eye, said arched portions being sufficiently wide to resiliently support the eye.

References Cited in the file of this patent

UNITED STATES PATENTS

| | | |
|---|---|---|
| 569,648 | Logan | Oct. 20, 1896 |
| 576,455 | Johnson | Feb. 2, 1897 |
| 1,380,519 | Bentor | June 7, 1921 |
| 1,730,026 | Warren | Oct. 1, 1929 |
| 2,186,746 | Albin | Jan. 9, 1940 |
| 2,419,420 | Price | Apr. 22, 1947 |
| 2,647,287 | Jones | Aug. 4, 1953 |